United States Patent
Kang et al.

(10) Patent No.: US 9,826,224 B2
(45) Date of Patent: *Nov. 21, 2017

(54) METHOD AND APPARATUS FOR NORMALIZING SIZE OF CONTENT IN MULTI-PROJECTION THEATER

(71) Applicant: CJ CGV CO., LTD., Seoul (KR)

(72) Inventors: Su Ryeon Kang, Goyang-si (KR); Jihyung Kang, Hwaseong-si (KR); Hwan Chul Kim, Seoul (KR)

(73) Assignee: CJ CGV CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/897,456

(22) PCT Filed: Nov. 26, 2014

(86) PCT No.: PCT/KR2014/011442
§ 371 (c)(1),
(2) Date: Dec. 10, 2015

(87) PCT Pub. No.: WO2015/080476
PCT Pub. Date: Jun. 4, 2015

(65) Prior Publication Data
US 2016/0134862 A1    May 12, 2016

(30) Foreign Application Priority Data
Nov. 29, 2013    (KR) .................. 10-2013-0147775

(51) Int. Cl.
*G03B 21/56* (2006.01)
*H04N 13/04* (2006.01)
*H04N 9/31* (2006.01)

(52) U.S. Cl.
CPC ......... *H04N 13/0497* (2013.01); *G03B 21/56* (2013.01); *H04N 9/3147* (2013.01); *H04N 9/3188* (2013.01); *H04N 13/0459* (2013.01)

(58) Field of Classification Search
CPC ...... G03B 21/56; G03B 21/147; G03B 37/00; G03B 37/04; H04N 13/0033; H04N 13/0051; H04N 13/0055
See application file for complete search history.

(56) References Cited

U.S. PATENT DOCUMENTS

| 5,963,247 A | 10/1999 | Banitt | |
| 5,964,064 A * | 10/1999 | Goddard | A63J 5/021 352/43 |

(Continued)

FOREIGN PATENT DOCUMENTS

| JP | 05323944 A | 12/1993 |
| JP | 2000122193 A | 4/2000 |

(Continued)

OTHER PUBLICATIONS

International Search Report for PCT/KR2014/011442 dated Feb. 6, 2015.

*Primary Examiner* — Sultan Chowdhury
(74) *Attorney, Agent, or Firm* — Hauptman Ham, LLP

(57) ABSTRACT

Disclosed herein are a method and apparatus for normalizing the size of content in a multi-projection theater and a computer-readable recording medium. The method may include receiving theater parameters stored in a database, computing the scale factor of an image project on a main screen based on the received theater parameters, controlling the image projected on the main screen by incorporating the computed scale factor into the image, and controlling an image projected on a sub-screen so that the height or width of at least any one of images of sub-screens having a different pixel size or ratio from the controlled image of the main screen is identical with a height or width of the controlled image of the main screen.

11 Claims, 3 Drawing Sheets

(56) References Cited

U.S. PATENT DOCUMENTS

| | | | | |
|---|---|---|---|---|
| 7,221,506 B1* | 5/2007 | Schlosser | ............... | G03B 21/56 |
| | | | | 160/219 |
| 2003/0156074 A1* | 8/2003 | Ranganathan | ........ | G06F 1/3203 |
| | | | | 345/1.1 |
| 2006/0152680 A1* | 7/2006 | Shibano | ................. | G03B 37/04 |
| | | | | 353/30 |
| 2011/0228104 A1 | 9/2011 | Nelson | | |
| 2013/0181901 A1 | 7/2013 | West | | |
| 2014/0204186 A1* | 7/2014 | Richards | .............. | H04N 9/3147 |
| | | | | 348/58 |

FOREIGN PATENT DOCUMENTS

| | | |
|---|---|---|
| JP | 2004186803 A | 7/2004 |
| KR | 1020100010991 A | 2/2010 |
| KR | 1020120020793 A | 3/2012 |
| KR | 101305249 B1 | 9/2013 |

* cited by examiner

[Fig. 1]
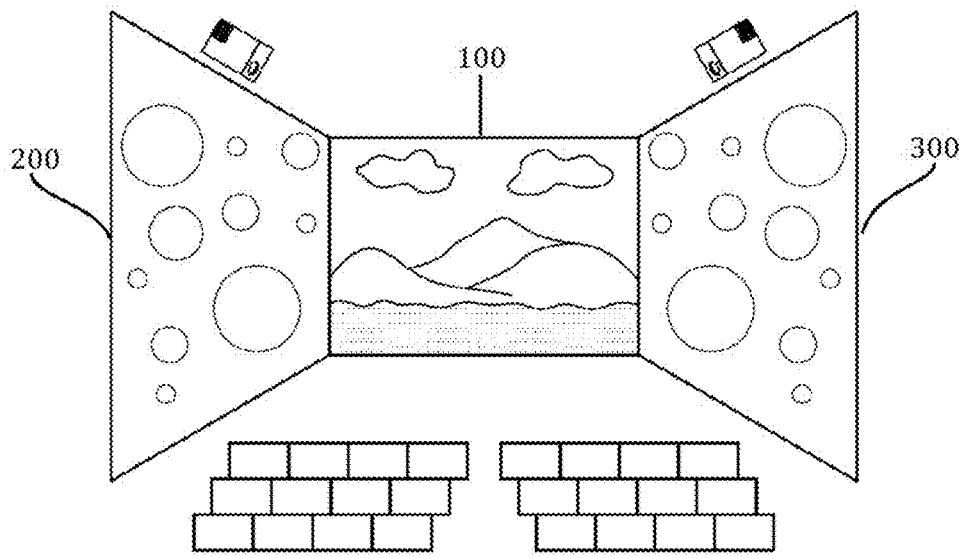
[Fig. 2]
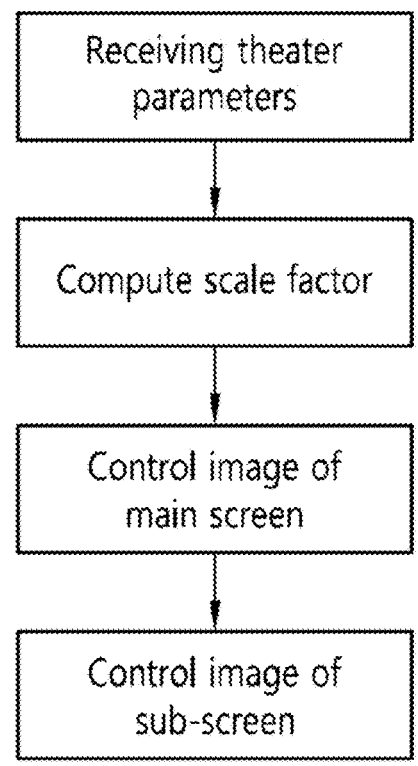

[Fig. 3]
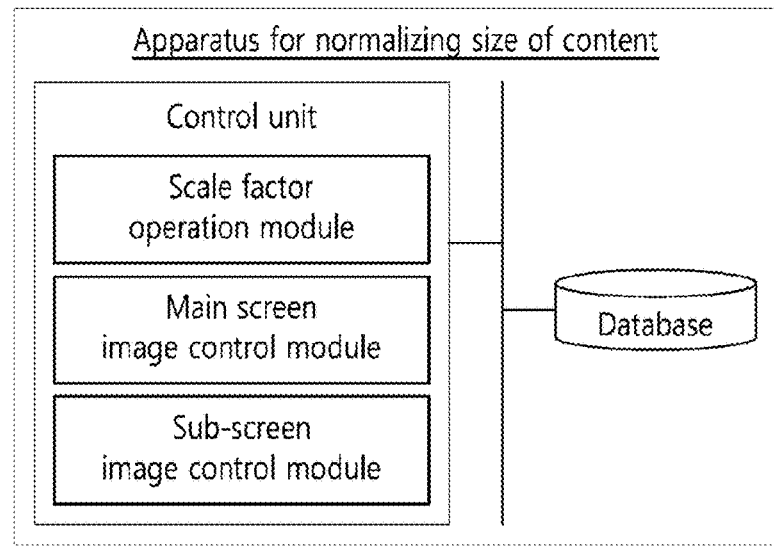
[Fig. 4]
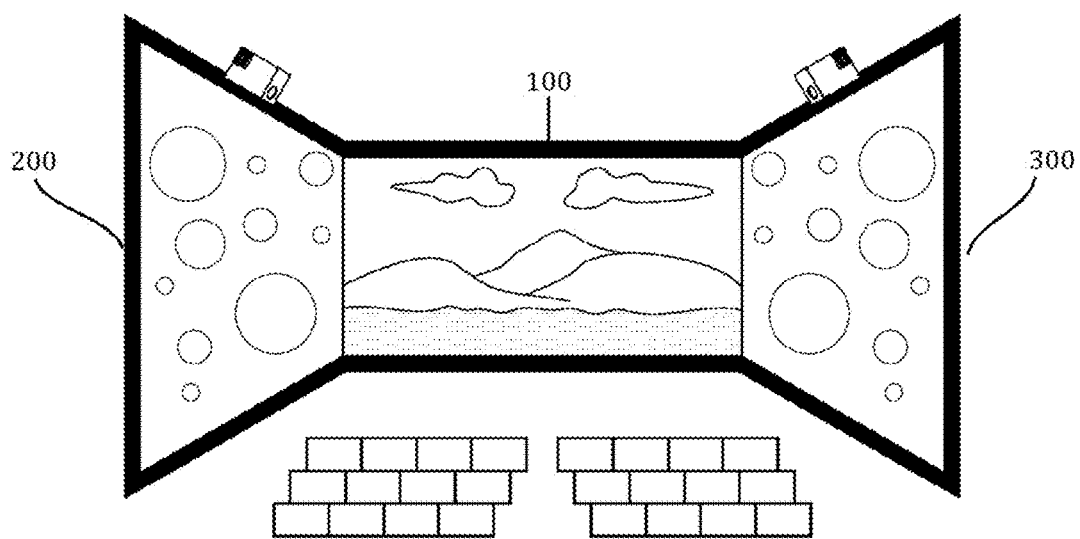

[Fig. 5]
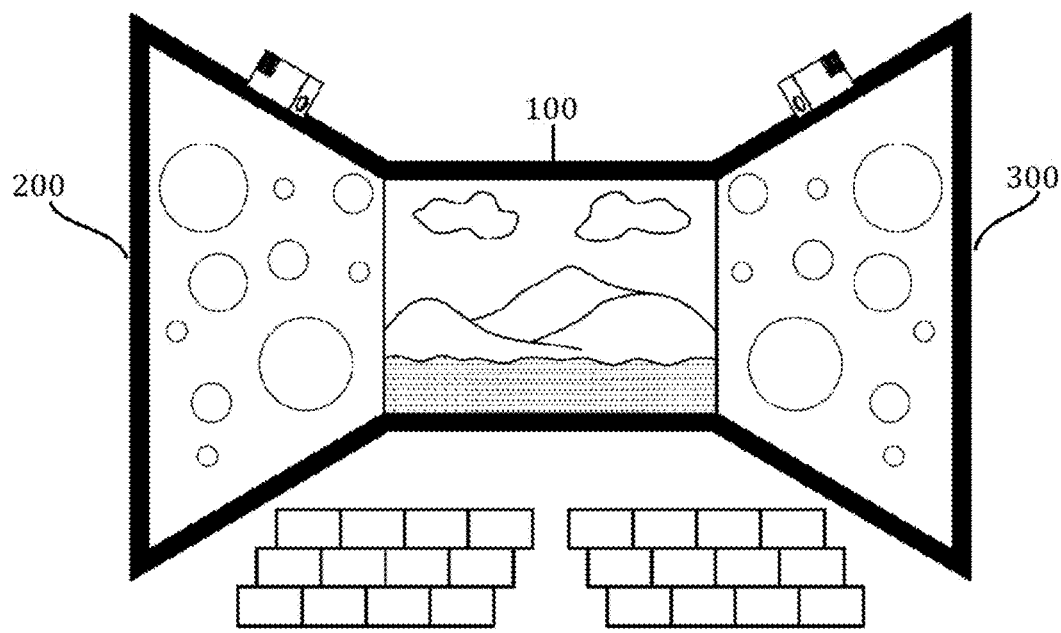
[Fig. 6]
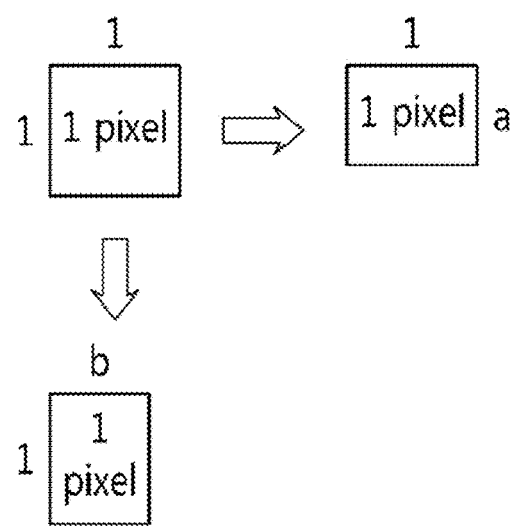

METHOD AND APPARATUS FOR NORMALIZING SIZE OF CONTENT IN MULTI-PROJECTION THEATER

CROSS REFERENCE TO RELATED APPLICATION

This application claims the priority of Korean Patent Application No. 10-2013-0147775 filed on Nov. 29, 2013 in the Korean Patent and Trademark Office. Further, this application is the National Phase application of International Application No. PCT/KR2014/011442 filed on Nov. 26, 2014, which is incorporated herein by reference in its entirety.

TECHNICAL FIELD

The present invention relates to a method for controlling the size of content and, more particularly, to a method for normalizing the size of image content projected on each of a plurality of projection surfaces in a multi-projection theater having the plurality of projection surfaces.

BACKGROUND ART

In a prior art, in order to play back images, such as movies and advertisements in a theater, a two-dimensional (2D) image is projected on a single screen disposed at the front of a movie theater. In such a system, audiences inevitably experience only 2D images.

A 3D image-related technology capable of providing a stereoscopic image to audiences has recently been developed. The 3D image technology is based on a principle that when different images enter the left eye and right eye of a person and are merged in a brain, the person is able to feel a three-dimensional effect even in a 2D image. In such a 3D image technology, two cameras on which different polarization filters are mounted are used to capture images, and glasses on which a polarization filter is mounted is used so that different images enter the left eye and right eye of a person when the person watches an image.

However, such a 3D technology may provide a stereoscopic image to a user, but is problematic in that a degree of immersion for an image itself is low because a user merely watches an image played back in a single screen. Furthermore, there is a problem in that the direction of a three-dimensional effect felt by audiences is limited to a direction in which a single screen is placed. Furthermore, the conventional 3D technology is problematic in that it may cause inconvenience for audiences who watch images because the audiences must wear glasses on which a polarization filter is mounted and that sensitive audiences may feel dizzy or sick because different images are forced to enter the left eye and right eye of a user.

Accordingly, a so-called "multi-projection system" (a preceding application of this application) capable of solving the problems of a conventional screening system based on a single screen was proposed. In this case, the "multi-projection system" means a system in which a plurality of projection surfaces (e.g., a screen and the surface of a wall) is disposed in the vicinity of stands and images having a sense of unity are played back on the plurality of projection surfaces so that audiences may have three-dimensional effects and immersive experiences. Furthermore, a "multi-projection theater" means a theater in which such a multi-projection system has been constructed. FIG. 1 illustrates an example of such a multi-projection system.

In order to effectively manage the multi-projection system, there is a need for technologies capable of effectively correcting images projected on a plurality of projection surfaces. The reason for this is that in the multi-projection system, an image correction process is very complicated and it is very likely that an error may occur because a plurality of images projected on a plurality of projection surfaces not on a single projection surface needs to be integrated and corrected and a method of correcting a plurality of images needs to be changed according to a change in the structure of a theater. Accordingly, there is a need for technologies that may assist the image correction process of such a multi-projection system.

In addition to such a multi-projection system, images may be projected on a single projection surface using a plurality of projectors. For example, images may be projected on a single projection surface using a plurality of projectors if the width of a projection surface is wide or if a length-width ratio of a projection surface is not handled by a single projector.

If images are to be projected using a plurality of projectors, it is very important to provide images having a sense of unity. In particular, images need to be corrected so that the boundaries of images or the overlap area and non-overlap area of images projected by respective projectors are not distinct.

SUMMARY OF INVENTION

Technical Problem

Accordingly, the present invention has been made keeping in mind the above problems occurring in the prior art, and an object of the present invention is to effectively provide a stereoscopic image in a multi-projection theater.

Solution to Problem

In accordance with an aspect of the present invention, there is provided a method of normalizing a size of content in a multi-projection theater, including receiving theater parameters stored in a database, computing the scale factor of an image project on a main screen based on the received theater parameters, controlling the image projected on the main screen by incorporating the computed scale factor into the image, and controlling an image projected on a sub-screen so that the height or width of at least any one of images of sub-screens having a different pixel size or ratio from the controlled image of the main screen is the same as that of the controlled image of the main screen.

In another embodiment, if the main screen and the sub-screen are not contiguous, the method may further include controlling the location of the image projected on the sub-screen by applying the theater parameters after controlling the scale of the image projected on the sub-screen. In this case, the image projected on the sub-screen may be masked by the width of the space between the main screen and the sub-screen, and the location of the image projected on the sub-screen may be moved by the width of the space.

Controlling the image projected on the main screen may include controlling the width to length ratio of each pixel of the image projected on the main screen.

In accordance with another aspect of the present invention, there is provided an apparatus for normalizing a size of content in a multi-projection theater, including a database configured to store theater parameters and a control unit configured to receive the theater parameters from the database and control images projected on a main screen and a sub-screen. The control unit includes a scale factor operation module configured to compute the scale factor of the image project on the main screen based on the received theater parameters, a main screen image control module configured to control the image projected on the main screen by incorporating the scale factor into the image, and a sub-screen image control module configured to control an image projected on a sub-screen so that the height or width of at least any one of images of sub-screens having a different pixel size or ratio from the controlled image of the main screen is the same as that of the controlled image of the main screen.

In another embodiment, if the main screen and the sub-screen are not contiguous as a result of analysis of the theater parameters received from the database, the sub-screen image control module may control the location of the image projected on the sub-screen by applying the theater parameters. In this case, the sub-screen image control module may mask the image projected on the sub-screen by the width of the space between the main screen and the sub-screen and move the location of the image of the sub-screen by the width of the space.

The main screen image control module may control the width to length ratio of each pixel of the image projected on the main screen.

The present invention may be implemented in the form of a computer-readable recording medium on which a program for executing the aforementioned method of normalizing the size of content in a multi-projection theater has been recorded.

Advantageous Effects of Invention

In accordance with the present invention, images that are united and have a stereoscopic effect can be played back in a multi-projection system for projecting images on a plurality of surfaces.

BRIEF DESCRIPTION OF DRAWINGS

FIG. 1 is a diagram illustrating an example of the structure of a multi-projection system;
FIG. 2 is a flowchart illustrating a method for normalizing the size of content in accordance with an embodiment of the present invention;
FIG. 3 illustrates the configuration of an apparatus for normalizing the size of content in accordance with an embodiment of the present invention;
FIGS. 4 and 5 are diagrams illustrating examples in which the present invention is applied to multi-projection theaters having different theater parameters; and
FIG. 6 is a diagram illustrating an example in which the size of content is normalized when an embodiment of the present invention is applied.

MODE FOR THE INVENTION

Some exemplary embodiments of the present invention are described in detail with reference to the accompanying drawings.

FIG. 2 is a flowchart illustrating a method for normalizing the size of content in accordance with an embodiment of the present invention.

The method for normalizing the size of content in a multi-projection theater includes receiving theater parameters stored in a database, computing the scale factor of an image project on a main screen based on the received theater parameters, controlling the image projected on the main screen by incorporating the computed scale factor into the image, and controlling an image projected on a sub-screen so that the height or width of at least any one of images of sub-screens having a different pixel size or ratio from the controlled image of the main screen is the same as that of the controlled image of the main screen.

The method in accordance with an embodiment of the present invention is executed by an apparatus for normalizing the size of content, etc. In order to normalize the size of content, first, theater parameters are received from the database. The theater parameters include information about the size, specification, etc. of a theater. The sizes and heights of the front and the left and right and the sizes of screens are different in almost all the theaters. Accordingly, the size of content needs to be normalized according to the specification of each theater. The theater parameters required for such normalization are as follows.

theaterWidth=[the width of the front of a theater]
theaterDepth=[the distance between the left and right walls of a theater]
theaterHeight=[the height of the front of a theater]
screenWidth=[the width of a screen]
screenOffset=[a length from the top of a screen to the ceiling of a theater]
screenRatio=[the ratio of a screen]

A variety of pieces of information, such as the size of the front of a theater, the size of a screen, and the size of the side, may be obtained using such parameters. The size of content may be normalized suitably for each theater by taking the variety of pieces of information into consideration. For reference, embodiments of FIGS. 1, 4, and 5 illustrate that a screen is disposed at the front of a theater and an image is directly projected on the surfaces of walls without a separate screen on the left and right sides, but they are only examples. For example, a screen may be disposed on each of the front and the sides, and an image may be projected on the surfaces of walls.

FIGS. 1, 4, 5, and 6 illustrate that screens 100, 200, 300 are disposed at the front and on the left and right sides, but the disposition of screens are not limited thereto. For example, the ceiling surface (i.e., the top surface) and bottom surface of a theater may also become projection surfaces on which images are projected. Furthermore, a separate screen may be disposed or top/bottom surfaces themselves may become screens.

An example in which screens are disposed on the front and on left/right faces is described hereinafter, but the present invention may also be applied to examples in which the height is converted into the width and images are projected on top/bottom surfaces in addition to on the front and the left/right faces.

In an embodiment of the present invention, a projection surface is illustrated as being divided into a screen (i.e., a main screen 100), that is, a criterion for the projection of an image, and a screen (i.e., a sub-screen 200 or 300) on which an image controlled based on the screen projected on the main screen is projected. Furthermore, a front screen 100 is illustrated as being the main screen, for convenience of description. It is however to be noted that a front screen may not be a main screen.

After obtaining the theater parameters, the scale factor of an image projected on a main screen is computed based on the received theater parameters.

The scale factor is a variable reflected in order to control the size of image content according to the screen ratio of a theater and may be determined depending on the type of a theater, in particular, a ratio of a main screen.

For example, a ratio of image content that is currently screened in a theater is a size of 2048*1080 pixels. The screen ratio of a theater is chiefly divided into a scope type (i.e., length: width=2.35:1) and a flat type (i.e., length: width=1.85:1). However, such an example is only a current screen ratio, and various screen ratios may be present in theaters. The present invention may be applied to all of various screen ratios and may also be applied to a screen having a ratio different from the ratio of the scope type or flat type according to an actual size of each theater.

First, an example in which a scale factor is computed in the scope type (2.35:1) is described below with reference to FIG. 4. The top and bottom of image content are subject to digital masking processing in order to adapt the image content for the scope type. In the case of image content of 2048*1080 pixels, 111 pixels at the bottom of the image content are subject to digital masking processing, and only 2048*858 pixels area are projected on the main screen. The 111 pixels have a ratio corresponding to 0.103 assuming that 1080 pixels in length is 1. The image content is projected on an area of 0.103~0.897 in the length of the image content, that is, an area of 0.794 in the total length. However, the numeral values, such as 2048, 1080, 111, and 858, are only an example used in an existing theater. It is to be noted that content must be produced, played back, and projected based on such numeral values and such numeral values may vary depending on the type of an image, the specification of a theater, etc.

The width of the image content is also controlled based on the ratio of 0.794 in which the length of the image content has been controlled. If a scale factor for controlling the width of the image content is x because the image content originally had 2048*1080 pixels, the following is required:

$$2048*x*:1080*0.794=2.35:1$$

In other words, since 2048*858 pixels obtained by performing digital masking on the 111 pixels at the top and bottom need to be projected on the screen of 2.35:1 ratio, $$2048*x:0.858=2.35:1$$

If this equation is computed, it leads to "the scale factor x in width=0.984."

The meaning of the scale factor x may be interpreted as follows. In principle, a 1 pixel has a square shape in which the width and the length are the same. If the scale factor x (in this example, 0.984) is applied to the width of each pixel in order to adapt the image content, subjected to digital masking by the 111 pixels at the top and bottom, for the screen ratio (2.35:1) of a theater of the scope type, a 1 pixel becomes a rectangular shape in which the width is short, but the length is long. If a scale factor is computed by taking a ratio of the image content and a ratio of the main screen into consideration and the computed scale factor is applied to image content projected on the main screen, the size and ratio of a unit pixel are changed. As a result, the width to length ratio of the image content may be adjusted in such a way as to be suitable for the main screen. That is, how an image will be scaled is computed, the image is controlled based on such scaling, and a degree that the image has been controlled is recorded/managed for each theater so that a degree that an image has been controlled may continue to be tracked for each theater.

Controlling the image projected on the main screen may be expressed in the following logical equation (Table 1).

TABLE 1

```
pixelRatio = (858*2.35/2048);
if(contentsRatio <= 2.35){
  normWidth = (858*contentsRatio/2048)/pixelRatio;
  normHeight = 858/1080;
}
else{
  normWidth = 1;
  normHeight = 2048/(contentsRatio*1080)*pixelRatio;
}
```

In the above equation, pixelRatio is a scale factor incorporated into image content that is projected on a screen, contentRatio is the width to length ratio of the content, normWidth is the width of normalized content, normHeight is the length of the normalized content.

In the normalization of content, if a content ratio is smaller than 2.35, the ratio of pixels and the size of the content are controlled by applying a scale factor to the width of the content on the basis of the length of the content. If a content ratio is not smaller than 2.35, the ratio of pixels and the size of content are controlled by applying a scale factor to the length of the content on the basis of the width of the content.

FIG. 5 is a diagram illustrating the size normalization of content in a multi-projection theater including a main screen of the flat type (1.85:1). An example in which a scale factor is computed is described with reference to FIG. 5. In the case of the flat type, the width of an image of 2048*1080 pixels is controlled on the basis of the length of the image because the image needs to be adapted for the ratio of 1.85:1. Since an image of 1998*1080 pixels is suitable for the ratio of 1.85:1, the original 2048 pixels of the image in width need to be multiplied by 0.976, resulting in the 1998 pixel size.

If the ratio of the width is smaller compared to 1.85:1 in a flat type theater, for example, in the case of 1.77:1, 2048 pixels in width need to be controlled because the length is fixed to 1080 pixels. In this example, the 2048 pixels need to be multiplied by 0.933. If the ratio of the width is greater than 1.85, the ratio of the length is controlled in the state in which the ratio of the width is fixed unlike in the previous example. That is, the ratio of the length is determined in the state in which the width is adapted for the ratio of 1.85:1 and multiplied by 0.976. If the ratio of the width is 2.35:1, $$2048*0.976: 1080*y=2.35: 1$$

As a result, y becomes 0.787. That is, the ratio of an image is controlled by applying a scale factor to the side whose scale needs to be reduced based on the side that has already been controlled. In accordance with such a method, an image can be controlled based on various theater parameters.

A process of normalizing a main screen in a flat type theater may be expressed in the following equation(Table 2).

TABLE 2

```
pixelRatio = 1.0;
if(contentsRatio <= 1.85){
  normWidth = (1080*contentsRatio/2048)/pixelRatio;
  normHeight = 1;
}
else{
  normWidth = 1998/2048;
  normHeight = 1998/(contentsRatio*1080)*pixelRatio;
}
```

In the normalization of content, if the width to length ratio of the content is smaller than 1.85, the width of the content is controlled based on the length of the content. If the width to length ratio of the content is equal to or greater than 1.85, the lengthy of the content is controlled based on the width of the content.

After controlling the image projected on the main screen, the scale of an image projected on a sub-screen is controlled according to the controlled image of the main screen.

Controlling the scale of the image projected on the sub-screen may be expressed in the following equation. In this case, it is assumed that the left and right sides are symmetrically scaled and the equation was written based on an image projected on a sub-screen on the right side.

center_project_width=normWidth*screenWidth;
center_project_height=normHeight*screenWidth/screenRatio;
right_project_height=center_project_height;
right_project_width=center_project_height*(right->width/right->height)

In this case, right->width and right->height are the width/length of input right image center_project_height and center_project_width mean an image projected on the main screen (i.e., an image having a controlled scale), and an image projected on the sub-screen is controlled based on the image having the controlled scale.

In the above equation, the height of the image projected on the sub-screen on the right side is made identical with that of the image projected on the main screen. The width of the image projected on the sub-screen is determined by taking into consideration the same height and the width to length ratio of the image projected on the main screen per pixel.

However, the height of the image projected on the sub-screen and the height of the image projected on the main screen do not need to be always the same. The height of an image projected on a sub-screen may be higher or lower than that of an image projected on a main screen. The heights of images may differ depending on the property of each of pieces of content, a producer's intention, and so on.

In an embodiment of the present invention, each of images projected on sub-screens has a different pixel size or ratio from a controlled image of a main screen, but the height or width of at least any one of the images projected on the sub-screens is controlled so that it is identical with that of the image of the main screen.

From FIGS. 4 and 5, it may be seen that the height of an image projected on a main screen is the same as that of each of images projected on sub-screens. However, the height of an image of the main screen does not need to be the same as that of each of images of the sub-screens. In some embodiments, the height of at least any one of images projected on the sub-screens may be the same as that of an image projected on the main screen. The reason for this is to maintain continuity between the image of the main screen and the images of the sub-screens. Accordingly, audience may recognize images played back in the respective screens of a multi-projection theater to be a generally piece of work as if the images represent the generally piece of work. In the aforementioned example, the height of the main screen disposed at the front has been illustrated as being the same as that of the sub-screen disposed on the side in order to play back an image generally having a sense of unity although the main screen has different pixels from the sub-screen. However, a sub-screen that neighbors a main screen does not need to have the same height or width as the main screen.

For example, if a sub-screen is disposed on a top surface (e.g., a surface of the ceiling) of a theater, the width of a main screen may be made the same as that of the sub-screen. In order to increase a feeling of immersion in an image, however, an image projected on the sub-screen (i.e., the surface of the ceiling) may be projected so that it fully fills the surface of the ceiling. In contrast, in order to increase power of concentration on the main screen (i.e., the front), the width of an area neighboring the main screen may be made smaller than that of the main screen.

In other words, as described above, in an embodiment of the present invention, the height or width of each of all the sub-screens does not need to be the same as that of the main screen, and the height or width of at least any one sub-screen may be the same as that of the main screen.

In an embodiment of the present invention, an image projected on a sub-screen is controlled so that it has a different pixel size or ratio from a controlled image of a main screen.

While an image is screened in a multi-projection theater, a single united image may have to be played back in all of the front and sub-screens. In contrast, different images may have to be played back in the main screen and the sub-screens depending on the characteristics of the image.

In the latter case, while a specific movie and advertisements are played back in the front, a special effect image that highlights a front image may be played back in the sides. In such a case, the image played back in the side is played back in order to highlight the front image rather than continuity between the side image and the front image. For example, if a front image is played back at a viewpoint that sees the front within an airplane flying at high speed, side images may be played as special images that may double the sensation of speed.

If a front image and a side image are discontinuously played back as described above, the image projected on the sub-screen may be controlled so that it has a different pixel size or ratio from the image projected on the main screen. That is, the image projected on the sub-screen may have a different pixel size or ratio from the front image depending on an object and effect of the image of the sub-screen without a need to control the image of the sub-screen so that it has the same pixel size and ratio as that of the main screen.

In the aforementioned example, the scale of the image projected on the sub-screen has been illustrated as being controlled after the image projected on the main screen is controlled, but the present invention is not limited thereto. For example, the scale of the image projected on the sub-screen may be first controlled, and the image projected on the main screen may be then controlled. That is, order described in the specification and/or the claims is not time-series, and may be reversed.

In this case, in a system to which an embodiment of the present invention has been applied, audience chiefly looks at image content projected on a front screen and in most cases, an image projected on the front screen is the core of content. Accordingly, the front screen preferably may be considered to be a main screen, and sub-screens may be controlled. Furthermore, to control a side screen based on a front screen is further efficient because the ratio of the front screen has been standardized in each theater, but the side screen is different depending on the structure of a theater in the aforementioned scope type and flat type.

In another embodiment of the present invention, a ratio of an image of a main screen and an image of a sub-screen may be controlled. In an image projected on a main screen, the ratio of pixels may be different, that is, a square of 1:1, a rectangle of 1:a, and a rectangle of b:1 ("a", "b" is a value between 0 and 1) depending on a ratio of the main screen as illustrated in FIG. 6. Accordingly, the same image content may be differently represented depending on the ratio of pixels. For example, an image of the same person may be represented as being slim (i.e., the ratio of pixels is b:1) or as being more fat (i.e., the ratio of pixels is 1:a) depending on the ratio of pixels.

In another embodiment of the present invention, controlling the image projected on the sub-screen may include changing the size or ratio of pixels depending on a point of time at which the image projected on the sub-screen is played back. An image projected on a sub-screen has a different pixel size or ratio from an image projected on a front screen, but the pixel size and ratio of the image of the sub-screen may be changed depending on a point of time at which the image is played back without being maintained constantly. For example, if an image played back in a sub-screen needs to be precisely represented, the pixel size of the image may be made small at a corresponding viewpoint. If another effect is required, the pixel size and ratio of the image may be controlled according to the effect.

In an embodiment of the present invention, although an image is played back in a sub-screen at a specific point of time at which the image is played back and at the same viewpoint, the pixel size or ratio of the image may be changed depending on an area within the sub-screen. That is, even in a single screen, the pixel size and ratio of a specific object or area (e.g., major information, such as a player and a character) within an image may be different from that of another object or area (e.g., a background) within the image. Various special effects, such as highlight and separating a background and a person, can be generated with respect to a specific object by controlling pixels of an image.

In the aforementioned embodiment, pixels are changed depending on a point of time at which an image is played back (i.e., time). In contrast, in the present embodiment, pixels are changed according to a playback area (i.e., space).

In yet another embodiment of the present invention, the pixel size or ratio of a specific area within a sub-screen may be made the same as that of a main screen. That is, the pixel size and ratio of a specific area within a sub-screen is made the same as that of a main screen so that a sense of unity and continuity are achieved between an image played back in the specific area and an image played back in the main screen.

The present embodiment has excellent advantages in the following case. If a specific object (e.g., a person) being played back in a main screen has moved to a sub-screen, a feeling of significant difference may be caused if the pixels of the specific object displayed in the sub-screen are different from those of the main screen. In accordance with the present embodiment, however, the pixel size or ratio of a specific object or area (e.g., an area in which a person is displayed) within a sub-screen may be made the same as that of a main screen. In this case, a united image can be played back in some area of the main screen and the sub-screen when continuity is required.

If images played back in respective faces need to be identically represented to a user in a multi-projection theater for playing back images in several faces, the pixel ratios of a front image and side images need to be controlled so that they are the same (e.g., immersion in an image may be hindered if the ratio varies depending on whether a person within the image is displayed on any of the front and the left and right sides.). If a main screen and a sub-screen have different pixel sizes or ratios as in the present invention, an apparatus for executing the method of normalizing the size of content in accordance with an embodiment of the present invention needs to independently adjust, control, and project an image projected on the front and an image projected on the side.

Even in such a case, in particular, an image projected on a main screen needs to be controlled based on the theater parameters of each theater. Accordingly, the width to length ratio of each pixel needs to be controlled. A detailed example in which a ratio of pixels is controlled has been described above.

The aforementioned method of normalizing the size of content in accordance with an embodiment of the present invention may be executed by an apparatus for executing the method. For example, a variety of types of computing devices may be used as the apparatus. For example, a computing device including a database and a processor may transfer theater parameters stored in the database to the processor. The processor may execute the processes described in the embodiments and send a control command into which the results of the execution have been incorporated to an external device (e.g., a projector) so that the size of content is normalized in a multi-projection theater.

The method in accordance with an embodiment of the present invention may be implemented in the form of a program for executing the method, and a computer-readable recording medium on which such a program has been recorded may be also included in the scope of the present invention.

An embodiment of the present invention is described below from a viewpoint of the apparatus. FIG. 3 illustrates the configuration of the apparatus for normalizing the size of content in accordance with an embodiment of the present invention. The apparatus includes the database configured to store theater parameters and a control unit configured to receive the theater parameters from the database and to control images projected on a main screen and sub-screens. The control unit includes a scale factor operation module configured to compute the scale factor of an image projected on a main screen based on received theater parameters, a main screen image control module configured to control the image projected on the main screen by incorporating the computed scale factor into the image, and a sub-screen image control module configured to control an image of a sub-screen having a different pixel size or ratio from the controlled image of the main screen so that the image of the sub-screen has the same height as the controlled image of the main screen. That is, the control unit basically includes an element for storing basic information for normalization and an element for normalizing content using the basic information.

The main screen image control module may control the width to length ratio of each pixel of an image projected on a main screen.

In an embodiment of the present invention, the sub-screen image control module may change the size or ratio of pixels based on a point of time at which an image projected on a sub-screen is played back and may change the size or ratio of pixels within a specific area within an image projected on a sub-screen. In particular, the pixel size or ratio of a specific area within a sub-screen may be controlled in such a way as to be the same as that of a main screen.

The embodiments of the present invention have been disclosed for illustrative purposes, and those skilled in the art will appreciate that various modifications, additions and substitutions are possible, without departing from the scope and spirit of the invention as disclosed in the accompanying claims.

The invention claimed is:

1. A method of normalizing a size of content in a multi-projection theater, the method comprising:
receiving theater parameters stored in a database;

computing a scale factor of an image project on a main screen based on the received theater parameters;

controlling the image projected on the main screen by incorporating the computed scale factor into the image; and controlling an image projected on a sub-screen so that a height or width of at least any one of images of sub-screens having a different pixel size or ratio from the controlled image of the main screen is identical with a height or width of the controlled image of the main screen.

2. The method of claim 1, wherein controlling the image projected on the main screen comprises controlling a width to length ratio of each pixel of the image projected on the main screen.

3. The method of claim 1, wherein controlling the image projected on the sub-screen comprises changing a pixel size or ratio based on a point of time at which the image projected on the sub-screen is played back.

4. The method of claim 1, wherein controlling the image projected on the sub-screen comprises changing a pixel size or ratio of an area in the image projected on the sub-screen.

5. The method of claim 4, wherein the pixel size or ratio of the area in the sub-screen is identical with a pixel size or ratio in the main screen.

6. An apparatus for normalizing a size of content in a multi-projection theater, the apparatus comprising:

a database configured to store theater parameters; and a control unit configured to receive the theater parameters from the database and control images projected on a main screen and a sub-screen, wherein the control unit comprises a scale factor operation module configured to compute a scale factor of the image project on the main screen based on the received theater parameters, a main screen image control module configured to control the image projected on the main screen by incorporating the scale factor into the image, and a sub-screen image control module configured to control an image projected on a sub-screen so that a height or width of at least any one of images of sub-screens having a different pixel size or ratio from the controlled image of the main screen is identical with a height or width of the controlled image of the main screen.

7. The apparatus of claim 6, wherein the main screen image control module controls a width to length ratio of each pixel of the image projected on the main screen.

8. The apparatus of claim 6, wherein the sub-screen image control module changes a pixel size or ratio based on a point of time at which the image projected on the sub-screen is played back.

9. The apparatus of claim 6, wherein the sub-screen image control module changes a pixel size or ratio of an area in the image projected on the sub-screen.

10. The apparatus of claim 9, wherein the pixel size or ratio of the area in the sub-screen is identical with a pixel size or ratio in the main screen.

11. A non-transitory computer-readable recording medium recording a computer program for executing a method for normalizing a size of content in a multi-projection theater, the method comprising:

receiving theater parameters stored in a database;

computing a scale factor of an image project on a main screen based on the received theater parameters;

controlling the image projected on the main screen by incorporating the computed scale factor into the image; and controlling an image projected on a sub-screen so that a height or width of at least any one of images of sub-screens having a different pixel size or ratio from the controlled image of the main screen is identical with a height or width of the controlled image of the main screen.

* * * * *